United States Patent
Okako et al.

(10) Patent No.: US 7,644,247 B2
(45) Date of Patent: Jan. 5, 2010

(54) SYSTEM CONTROLLER FOR FLASH MEMORY

(75) Inventors: Norikazu Okako, Tokyo (JP); Yugi Ito, Tokyo (JP); Katsuya Uematsu, Tokyo (JP)

(73) Assignee: TDK Corporation, Tokyo (JP)

( * ) Notice: Subject to any disclaimer, the term of this patent is extended or adjusted under 35 U.S.C. 154(b) by 384 days.

(21) Appl. No.: 11/878,410

(22) Filed: Jul. 24, 2007

(65) Prior Publication Data

US 2008/0028190 A1    Jan. 31, 2008

(30) Foreign Application Priority Data

Jul. 25, 2006    (JP)    ............... 2006-201501

(51) Int. Cl.
  *G06F 13/00*    (2006.01)
(52) U.S. Cl. .................. 711/163; 711/103; 711/154
(58) Field of Classification Search .......... 711/103, 711/154, 163
  See application file for complete search history.

(56) References Cited

U.S. PATENT DOCUMENTS

| | | | | |
|---|---|---|---|---|
| 4,937,783 A | * | 6/1990 | Lee | .............. 712/205 |
| 5,032,975 A | * | 7/1991 | Yamamoto et al. | ............. 700/5 |
| 5,420,998 A | * | 5/1995 | Horning | .............. 711/113 |
| 5,905,245 A | | 5/1999 | Tanaka | |
| 7,117,350 B2 | | 10/2006 | Harada | |
| 2005/0033455 A1 | * | 2/2005 | Kasdan et al. | ............. 700/12 |
| 2008/0140224 A1 | * | 6/2008 | Kasdan et al. | ............. 700/3 |

FOREIGN PATENT DOCUMENTS

| JP | A-05-289818 | 11/1993 |
|---|---|---|
| JP | A-09-171546 | 6/1997 |
| JP | A-2000-207137 | 7/2000 |
| JP | A-2004-343682 | 12/2004 |
| JP | A-2005-242632 | 9/2005 |

* cited by examiner

*Primary Examiner*—Reba I Elmore
(74) *Attorney, Agent, or Firm*—Oliff & Berridge, PLC

(57) ABSTRACT

A system controller exchanges data with a memory controller. The system controller includes an interpreting unit, a first instruction data supplying unit, a second instruction data supplying unit, and a controlling unit. The second instruction data supplying unit transfers the first operation instruction data provided from a host system to the memory controller. If the interpreting unit interprets the first operation instruction data as data instructing to begin an operation with the second instruction data supplying unit, the controlling unit shifts to a first mode that halts the first instruction data supplying unit and that begins an operation with the second instruction data supplying unit.

11 Claims, 14 Drawing Sheets

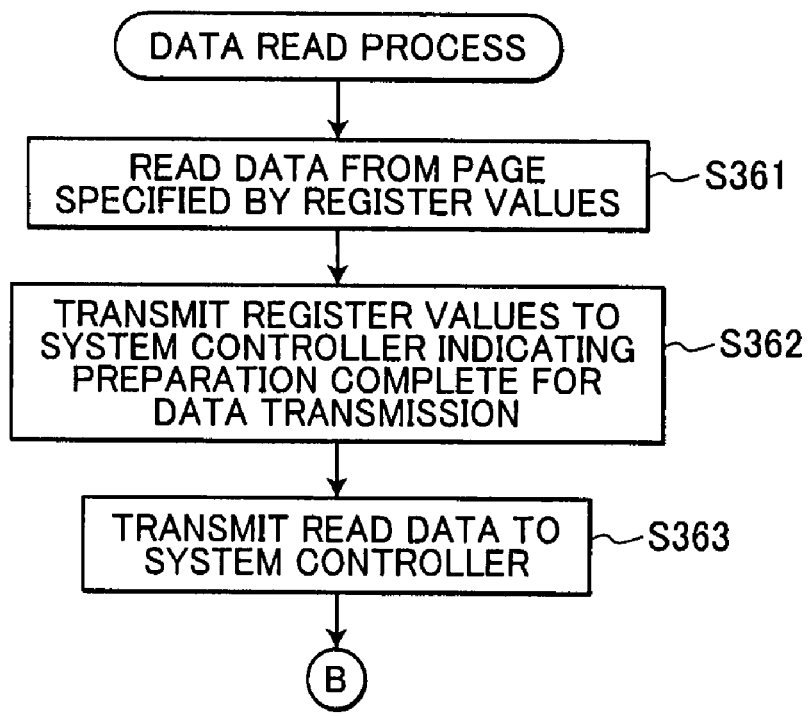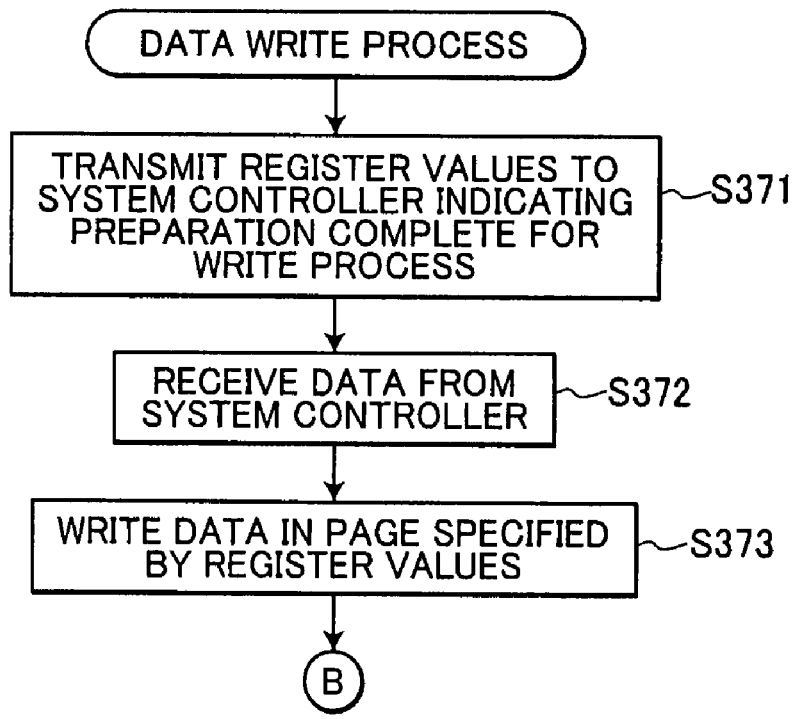

| FEATURE REGISTER | 00h | NON-DATA COMMAND PROTOCOL |
| --- | --- | --- |
| SECTOR COUNT REGISTER | 00h | NUMBER OF SECTORS TO BE TRANSFERRED |
| SECTOR NUMBER REGISTER | 00h | SPECIFICATION FOR LOW-ORDER CONTROLLER |
| CYLINDER LOW REGISTER | 4Bh | 'K' |
| CYLINDER HIGH REGISTER | 45h | 'E' |
| DEVICE HEAD REGISTER | 59h | 'Y' |
| COMMAND REGISTER | FFh | SHIFT TO PASS-THROUGH MODE |

| FEATURE REGISTER | 00h | |
| --- | --- | --- |
| SECTOR COUNT REGISTER | 00h | |
| SECTOR NUMBER REGISTER | 00h | |
| CYLINDER LOW REGISTER | E8h | BLOCK ADDRESS (LOW-ORDER) |
| CYLINDER HIGH REGISTER | 03h | BLOCK ADDRESS (HIGH-ORDER) |
| DEVICE HEAD REGISTER | 00h | |
| COMMAND REGISTER | F1h | ERASURE COMMAND |

| ERROR REGISTER | 00h |
|---|---|
| SECTOR COUNT REGISTER | 00h |
| SECTOR NUMBER REGISTER | 00h |
| CYLINDER LOW REGISTER | 00h |
| CYLINDER HIGH REGISTER | 00h |
| DEVICE HEAD REGISTER | 00h |
| STATUS REGISTER | 50h |

OPERATION COMPLETED NORMALLY

| FEATURE REGISTER | 00h | NON-DATA COMMAND PROTOCOL |
|---|---|---|
| SECTOR COUNT REGISTER | 00h | |
| SECTOR NUMBER REGISTER | 00h | SPECIFICATION FOR LOW-ORDER CONTROLLER |
| CYLINDER LOW REGISTER | 4Bh | 'K' |
| CYLINDER HIGH REGISTER | 45h | 'E' |
| DEVICE HEAD REGISTER | 59h | 'Y' |
| COMMAND REGISTER | FEh | RETURN COMMAND |

| FEATURE REGISTER | 01h | PIO DATA IN PROTOCOL |
| --- | --- | --- |
| SECTOR COUNT REGISTER | 02h | NUMBER OF SECTORS TO BE TRANSFERRED |
| SECTOR NUMBER REGISTER | 01h | SPECIFICATION FOR LOW-ORDER CONTROLLER |
| CYLINDER LOW REGISTER | 4Bh | 'K' |
| CYLINDER HIGH REGISTER | 45h | 'E' |
| DEVICE HEAD REGISTER | 59h | 'Y' |
| COMMAND REGISTER | FFh | SHIFT TO PASS-THROUGH MODE |

| FEATURE REGISTER | 00h | |
| --- | --- | --- |
| SECTOR COUNT REGISTER | 00h | |
| SECTOR NUMBER REGISTER | 0Fh | PAGE |
| CYLINDER LOW REGISTER | E8h | BLOCK ADDRESS (LOW-ORDER) |
| CYLINDER HIGH REGISTER | 03h | BLOCK ADDRESS (HIGH-ORDER) |
| DEVICE HEAD REGISTER | 00h | |
| COMMAND REGISTER | F2h | READ COMMAND |

| ERROR REGISTER | 00h |
|---|---|
| SECTOR COUNT REGISTER | 00h |
| SECTOR NUMBER REGISTER | 0Fh |
| CYLINDER LOW REGISTER | E8h |
| CYLINDER HIGH REGISTER | 03h |
| DEVICE HEAD REGISTER | 00h |
| STATUS REGISTER | 58h |

PREPARATION COMPLETE

| ERROR REGISTER | 00h |
|---|---|
| SECTOR COUNT REGISTER | 00h |
| SECTOR NUMBER REGISTER | 00h |
| CYLINDER LOW REGISTER | 00h |
| CYLINDER HIGH REGISTER | 00h |
| DEVICE HEAD REGISTER | 00h |
| STATUS REGISTER | 50h |

OPERATION COMPLETE

| FEATURE REGISTER | 01h | PIO DATA IN COMMAND PROTOCOL |
|---|---|---|
| SECTOR COUNT REGISTER | 00h | |
| SECTOR NUMBER REGISTER | 01h | SPECIFICATION FOR LOW-ORDER CONTROLLER |
| CYLINDER LOW REGISTER | 4Bh | 'K' |
| CYLINDER HIGH REGISTER | 45h | 'E' |
| DEVICE HEAD REGISTER | 59h | 'Y' |
| COMMAND REGISTER | FEh | RETURN COMMAND |

| FEATURE REGISTER | 02h | PIO DATA OUT COMMAND PROTOCOL |
|---|---|---|
| SECTOR COUNT REGISTER | 02h | NUMBER OF SECTORS TO BE TRANSFERRED |
| SECTOR NUMBER REGISTER | 02h | SPECIFICATION FOR LOW-ORDER CONTROLLER |
| CYLINDER LOW REGISTER | 4Bh | 'K' |
| CYLINDER HIGH REGISTER | 45h | 'E' |
| DEVICE HEAD REGISTER | 59h | 'Y' |
| COMMAND REGISTER | FFh | SHIFT TO PASS-THROUGH MODE |

| FEATURE REGISTER | 00h | |
| --- | --- | --- |
| SECTOR COUNT REGISTER | 00h | |
| SECTOR NUMBER REGISTER | 0Fh | PAGE |
| CYLINDER LOW REGISTER | E8h | BLOCK ADDRESS (LOW-ORDER) |
| CYLINDER HIGH REGISTER | 03h | BLOCK ADDRESS (HIGH-ORDER) |
| DEVICE HEAD REGISTER | 00h | |
| COMMAND REGISTER | F3h | WRITE COMMAND |

| ERROR REGISTER | 00h | |
| --- | --- | --- |
| SECTOR COUNT REGISTER | 00h | |
| SECTOR NUMBER REGISTER | 0Fh | |
| CYLINDER LOW REGISTER | 08h | |
| CYLINDER HIGH REGISTER | 03h | |
| DEVICE HEAD REGISTER | 00h | |
| STATUS REGISTER | 58h | PREPARATION COMPLETE |

| ERROR REGISTER | 00h |
| --- | --- |
| SECTOR COUNT REGISTER | 00h |
| SECTOR NUMBER REGISTER | 00h |
| CYLINDER LOW REGISTER | 00h |
| CYLINDER HIGH REGISTER | 00h |
| DEVICE HEAD REGISTER | 00h |
| STATUS REGISTER | 50h |

STATUS REGISTER 50h — OPERATION COMPLETE

| FEATURE REGISTER | 02h |
| --- | --- |
| SECTOR COUNT REGISTER | 00h |
| SECTOR NUMBER REGISTER | 02h |
| CYLINDER LOW REGISTER | 4Bh |
| CYLINDER HIGH REGISTER | 45h |
| DEVICE HEAD REGISTER | 59h |
| COMMAND REGISTER | FEh |

FEATURE REGISTER 02h — PIO DATA OUT COMMAND PROTOCOL
SECTOR NUMBER REGISTER 02h — SPECIFICATION FOR LOW-ORDER CONTROLLER
CYLINDER LOW REGISTER 4Bh — 'K'
CYLINDER HIGH REGISTER 45h — 'E'
DEVICE HEAD REGISTER 59h — 'Y'
COMMAND REGISTER FEh — RETURN COMMAND

SYSTEM CONTROLLER FOR FLASH MEMORY

BACKGROUND OF THE INVENTION

1. Field of the Invention

The present invention relates to a system controller for flash memory, a flash memory system having the system controller, and a method for controlling flash memory modules.

2. Description of the Related Art

Various data storage devices having a high-order controller and a plurality of semiconductor disks have been proposed. By controlling the semiconductor disks configured of semiconductor memory and a low-order controller (memory controller), the high-order controller can treat the plurality of semiconductor disks as a single semiconductor disk (see Japanese unexamined patent application publication No. 2000-207137, for example). Various methods for controlling a disk array in which a high-order controller controls a plurality of disk devices have also been proposed. In the disk array, the high-order controller interprets commands issued from a host system and inputs reconfigured commands into the disk devices for efficiently controlling the disk array (see Japanese unexamined patent application publication No. HEI-5-289818, for example).

SUMMARY OF THE INVENTION

However, in the data storage device that uses semiconductor memory described above, when the memory controller (low-order controller) must execute its own vendor commands in order to analyze memory problems, the control program for the high-order controller must be recoded for each case. When the semiconductor disk is configured by mounting the high-order controller, memory controller (low-order controller), and semiconductor memory on the same circuit board, it is particularly essential to use the memory controller's vendor commands to initialize semiconductor memory at the factory prior to shipment.

Therefore, it is an object of the present invention to provide a system controller for flash memory, a flash memory system having the system controller, and a method for controlling flash memory modules capable of reducing development time and costs, without rewriting the control program for the system controller (high-order controller) based on vendor commands specific to the memory controller (low-order controller).

In order to attain these objects, the system controller according to the present invention functions to exchange data with a memory controller that accesses flash memory and to exchange data with a host system. The system controller includes an interpreting unit, a first instruction data supplying unit, a second instruction data supplying unit, and a controlling unit. The interpreting unit interprets first operation instruction data supplied from the host system. The first instruction data supplying unit generats second operation instruction data based on a result of interpretation by the interpreting unit. The second operation instruction data instructs the memory controller to execute an operation. The first instruction data supplying unit transmits the second operation instruction data to the memory controller. The second instruction data supplying unit transfers the first operation instruction data provided from the host system to the memory controller. The controlling unit selectively operats the first instruction data supplying unit and the second instruction data supplying unit. If the interpreting unit interprets the first operation instruction data as data instructing to begin an operation with the second instruction data supplying unit, the controlling unit shifts to a first mode that halts the first instruction data supplying unit and that begins an operation with the second instruction data supplying unit. If the interpreting unit interprets the first operation instruction data as data instructing to halt the second instruction data supplying unit, the controlling unit shifts to a second mode that halts the second instruction data supplying unit and that begins an operation with the first instruction data supplying unit.

The system controller may further include an operation result transferring unit transferring data provided from the memory controller to the host system while the second instruction data supplying unit is operating. The data indicates a result of an operation implemented by the memory controller based on the first operation instruction data.

It is preferable that if the first operation instruction data instructs to begin an operation with the second instruction data supplying unit, the first operation instruction data includes an identifier identifying the memory controller to transfer data. If is also preferable that the first operation instruction data further includes a command for shifting to the first mode if the first operation instruction data instructs to begin an operation with the second instruction data supplying unit. It is also preferable that the first operation instruction data further includes a keyword for permitting to shift to the first mode if the first operation instruction data instructs to begin an operation with the second instruction data supplying unit.

According to another aspects, the invention provides a flash memory system to exchange data with a host system. The flash memory system includes a flash memory, a memory controller and a system controller. The memory controller accesses the flash memory. The system controller exchanges data with the memory controller. The system controller includes an interpreting unit, a first instruction data supplying unit, second instruction data supplying unit, and a controlling unit. The interpreting unit interprets first operation instruction data supplied from the host system. The first instruction data supplying unit generates second operation instruction data based on a result of interpretation by the interpreting unit. The second operation instruction data instructs the memory controller to execute an operation. The first instruction data supplying unit transmits the second operation instruction data to the memory controller. The second instruction data supplying unit transfers the first operation instruction data provided from the host system to the memory controller. The controlling unit selectively operates the first instruction data supplying unit and the second instruction data supplying unit. If the interpreting unit interprets the first operation instruction data as data instructing to begin an operation with the second instruction data supplying unit, the controlling unit shifts to a first mode that halts the first instruction data supplying unit and that begins an operation with the second instruction data supplying unit. If the interpreting unit interprets the first operation instruction data as data instructing to halt the second instruction data supplying unit, the controlling unit shifts to a second mode that halts the second instruction data supplying unit and that begins an operation with the first instruction data supplying unit.

The flash memory system may further include an operation result transferring unit transferring data provided from the memory controller to the host system while the second instruction data supplying unit is operating. The data indicates a result of an operation implemented by the memory controller based on the first operation instruction data.

It is preferable that if the first operation instruction data instructs to begin an operation with the second instruction data supplying unit, the first operation instruction data includes an identifier identifying the memory controller to transfer data. If is also preferable that the first operation instruction data further includes a command for shifting to the first mode if the first operation instruction data instructs to begin an operation with the second instruction data supplying unit. It is also preferable that the first operation instruction data further includes a keyword for permitting to shift to the first mode if the first operation instruction data instructs to begin an operation with the second instruction data supplying unit.

According to still another aspects, the invention provides a method for controlling a plurality of flash memory modules, based on data supplied from a host system. Each of the plurality of the flash memory modules includes a flash memory and a memory controller that accesses the flash memory. The method includes interpreting first operation instruction data supplied from the host system, generating a second operation instruction data and transmitting resultant data to the memory controller to execute an operation based on a result of interpretation by the interpreting step, and transferring the first operation instruction data provided from the host system to the memory controller, selectively executing the generating/transmitting step and the transferring step. If the interpreting step interprets the first operation instruction data to be data instructing to begin the transferring step, the selectively operating step halts the generating/transmitting step and operates the transferring step. If the interpreting step interprets the first operation instruction data to be data instructing to halt the transferring step, the selectively operating step halts the transferring step, and begins the generating/transmitting step.

BRIEF DESCRIPTION OF THE DRAWINGS

In the drawings:

FIG. 8 is a flowchart illustrating steps in a data read process performed on the memory controller;

FIG. 9 is a flowchart illustrating steps in a data write process performed on the memory controller;

FIG. 10 is a table showing register values instructing a pass-through mode shift in the non-data command protocol;

FIG. 11 is a table showing register values instructing a data erasure;

FIG. 12 is a table showing register values providing notification that the data erasure operation on the memory controller is complete;

FIG. 13 is a table showing register values instructing an end to the pass-through mode in the non-data command protocol;

FIG. 14 is a table showing register values instructing a shift to the pass-through mode according to the PIO data-in command protocol;

FIG. 15 is a table showing register values instructing a data read;

FIG. 16 is a table showing register values providing notification that the memory controller has completed preparations for a data transfer;

FIG. 17 is a table showing register values providing notification that the memory controller has completed the data read operation;

FIG. 18 is a table showing register values instructing an end to the pass-through mode according to the PIO data-in command protocol;

FIG. 19 is a table showing register values instructing a shift to the pass-through mode according to the PIO data-out command protocol;

FIG. 20 is a table showing register values instructing a data write;

FIG. 21 is a table showing register values providing notification that the memory controller has completed preparations for a data write operation;

FIG. 22 is a table showing register values providing notification that the memory controller has completed the data write operation; and FIG. 23 is a table showing register values instructing an end to the pass-through mode according to the PIO data-out command protocol.

DESCRIPTION OF THE PREFERRED EMBODIMENTS

Figure 1:
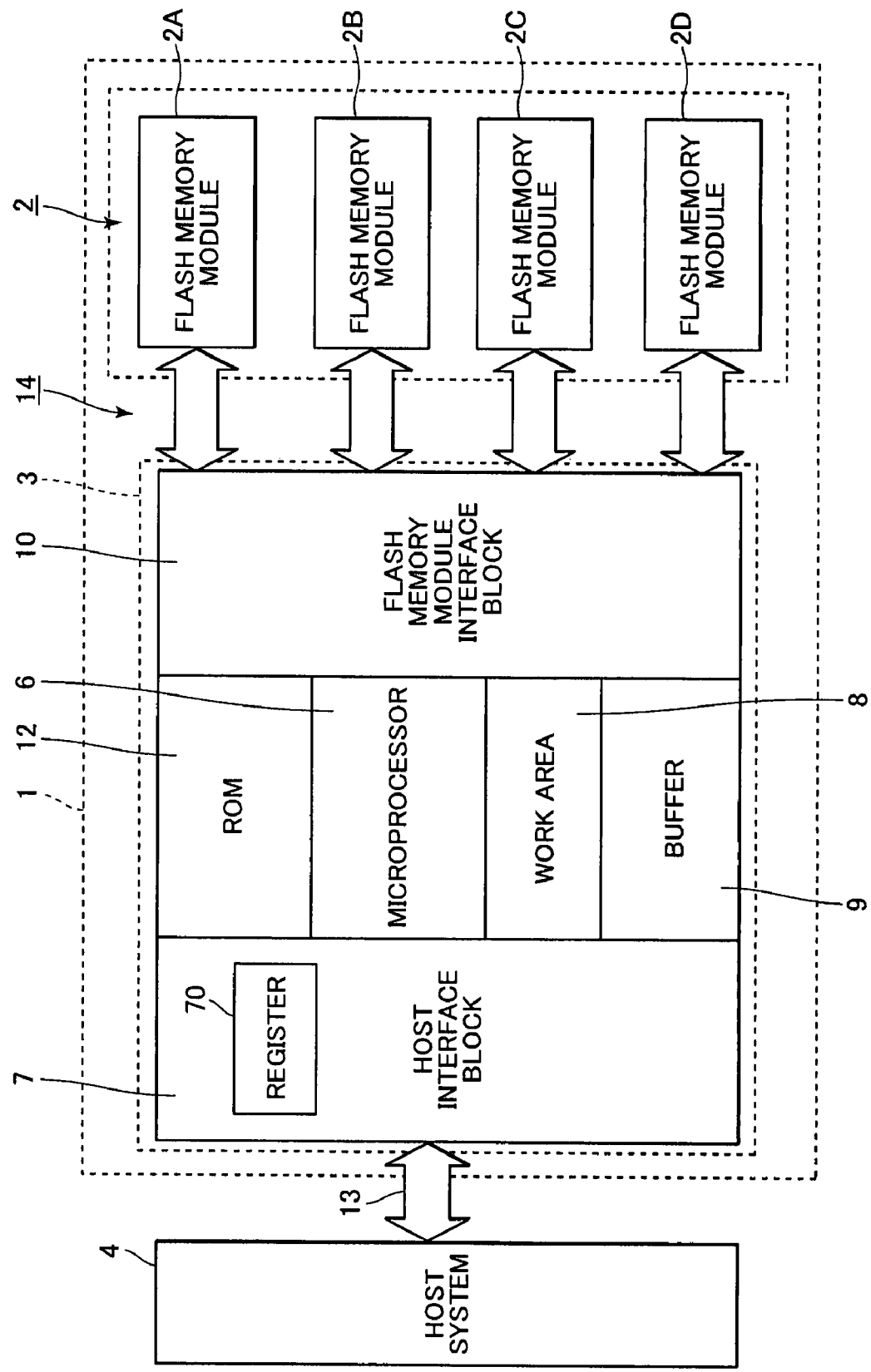
FIG. 1 is a block diagram showing the structure of a flash memory system according to a preferred embodiment of the present invention.

A system controller for flash memory, a flash memory system having the system controller, and a method for controlling flash memory modules according to a preferred embodiment of the present invention will be described while referring to FIGS. 1 through 23.

First, the structure of a flash memory system according to the preferred embodiment will be described. As shown in the block diagram in FIG. 1, a flash memory system 1 according to the preferred embodiment is configured of $2^n$ ($2^2$=4 in FIG. 1) flash memory modules 2 (2A-2D), and a system controller 3 for controlling the flash memory modules 2.

The flash memory system 1 is connectable to a host system 4 via an external bus 13. The host system 4 is configured of a central processing unit (CPU) (not shown) for controlling the overall operations of the host system 4, a companion chip for exchanging data with the flash memory system 1. The host system 4 may be any of various data processors for processing text, voice, image data, such as a personal computer or a digital still camera.

The flash memory modules 2A-2D are storage devices, each having an identical construction, controlled by the system controller 3, which is a high-order controller.

As shown in FIG. 1, the system controller 3 includes a microprocessor 6, a host interface block 7, a work area 8, a buffer 9, a flash memory module interface block 10, and a read only memory (ROM) 12. The system controller 3 configured of these functional blocks is integrated on a single semiconductor chip. Next, the functional blocks will be described.

The microprocessor 6 controls the overall operations of the system controller 3 according to programs stored in the ROM 12. For example, the microprocessor 6 reads a command set defining various processes from the ROM 12, supplies the command set to the flash memory module interface block 10, and instructs the flash memory module interface block 10 to execute the process.

Figure 2:
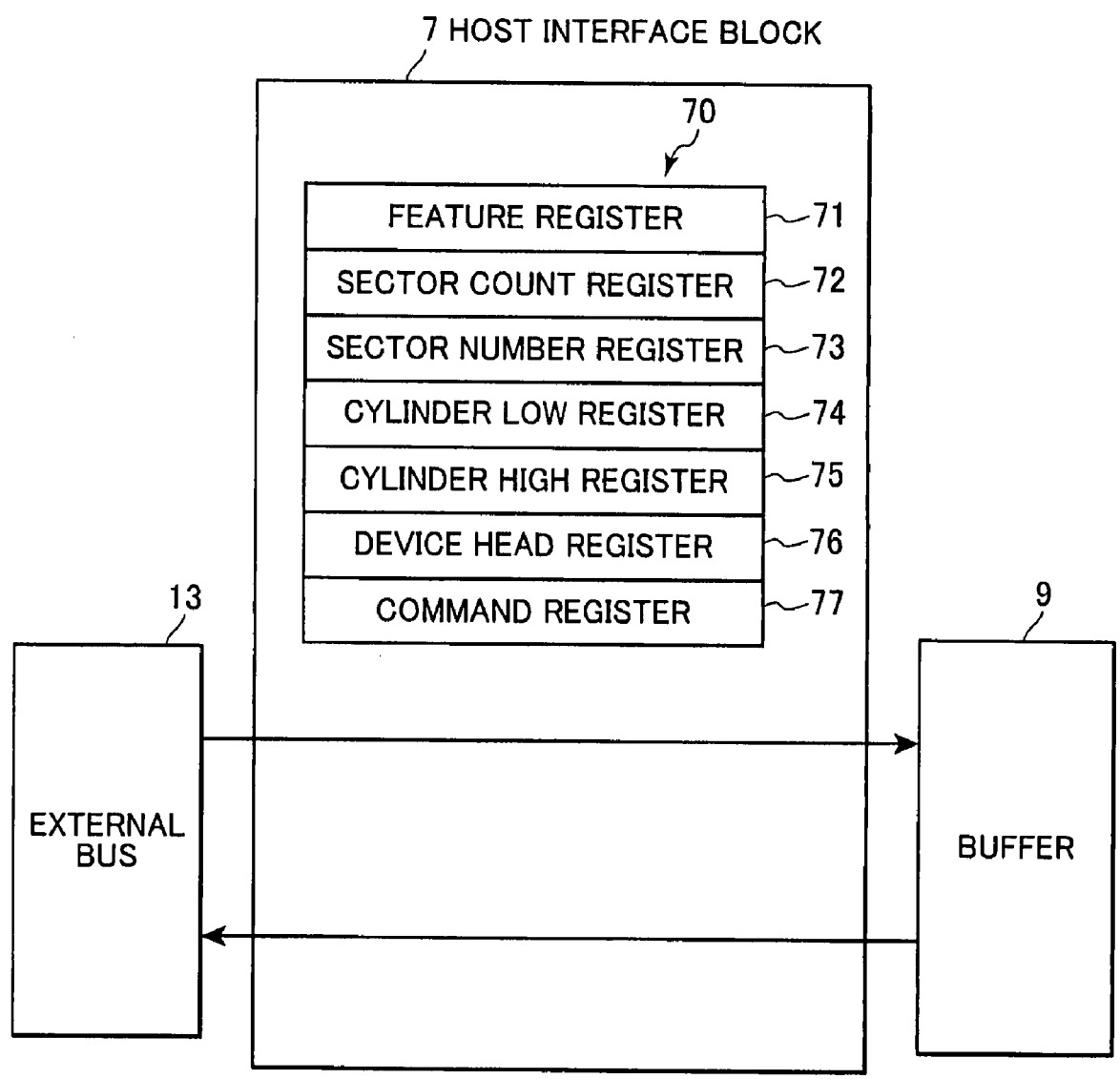
FIG. 2 is a block diagram showing the structure of a host interface block in a system controller.

As shown in FIG. 2, the host interface block 7 is provided with registers 70, including a Feature register 71, a Sector Count register 72, a Sector Number register 73, a Cylinder Low register 74, a Cylinder High register 75, a Device Head register 76, and a Command register 77, as well as a Data register, Status register, and Error register not shown in the drawings. The registers 70 function to exchange address data, status data, external commands, and other data with the host system 4. The same address is assigned to the Feature register 71 and the Error register. During a write operation, the register value is set in the Feature register 71. During a read operation, the register value set in the Error register is read. Further, the same address is assigned to the Command register 77 and the Status register. During a write operation, the register value is set in the Command register 77. During a read operation, the register value set in the Status register is read.

Next, the data set in each register during mode shifts will be described. The value set in the Feature register 71 indicates the type of command protocol. The value set in the Sector Count register 72 indicates the sector count for data to be read or written. The value stored in the Sector Number register 73 indicates an identifier for a memory controller 203, described below, that will execute a command after shifting to a pass-through mode. Values set in the Cylinder Low register 74, Cylinder High register 75, and Device Head register 76 indicate keywords for allowing a mode change. The value set in the Command register 77 indicates a pass-through mode shift command or pass-through mode end command described later, or a command to be executed by the memory controller 203. The value set in the Status register indicates a data request to the host system 4.

Data supplied from the host system 4 to the flash memory system 1 is inputted into the buffer 9, for example, in the flash memory system 1 via the host interface block 7. Data supplied from the flash memory system 1 to the host system 4 is outputted through the host interface block 7.

The work area 8 is used to temporarily store data required for controlling the flash memory modules 2A-2D and is configured of a plurality of static random access memory (SRAM) cells.

The buffer 9 temporarily accumulates data that has been read from the flash memory modules 2A-2D and data to be written thereto. Specifically, data read from the flash memory modules 2A-2D and transmitted to the system controller 3 is stored in the buffer 9 until the data can be transferred from the buffer 9 to the host system 4. Further, data to be written to the flash memory modules 2A-2D is stored temporarily in the buffer 9 until the data can be transmitted to the flash memory modules 2A-2D.

The flash memory module interface block 10 exchanges address data, status data, external commands, and other data with the flash memory modules 2A-2D via an internal bus 14.

The ROM 12 is a nonvolatile storage device for storing programs that define steps in processes executed by the microprocessor 6.

Next, the flash memory modules 2A-2D will be described. Since the flash memory modules 2A-2D have identical structures, the structure of the flash memory module 2A shown in FIG. 3 will be used as an example.

Figure 3:
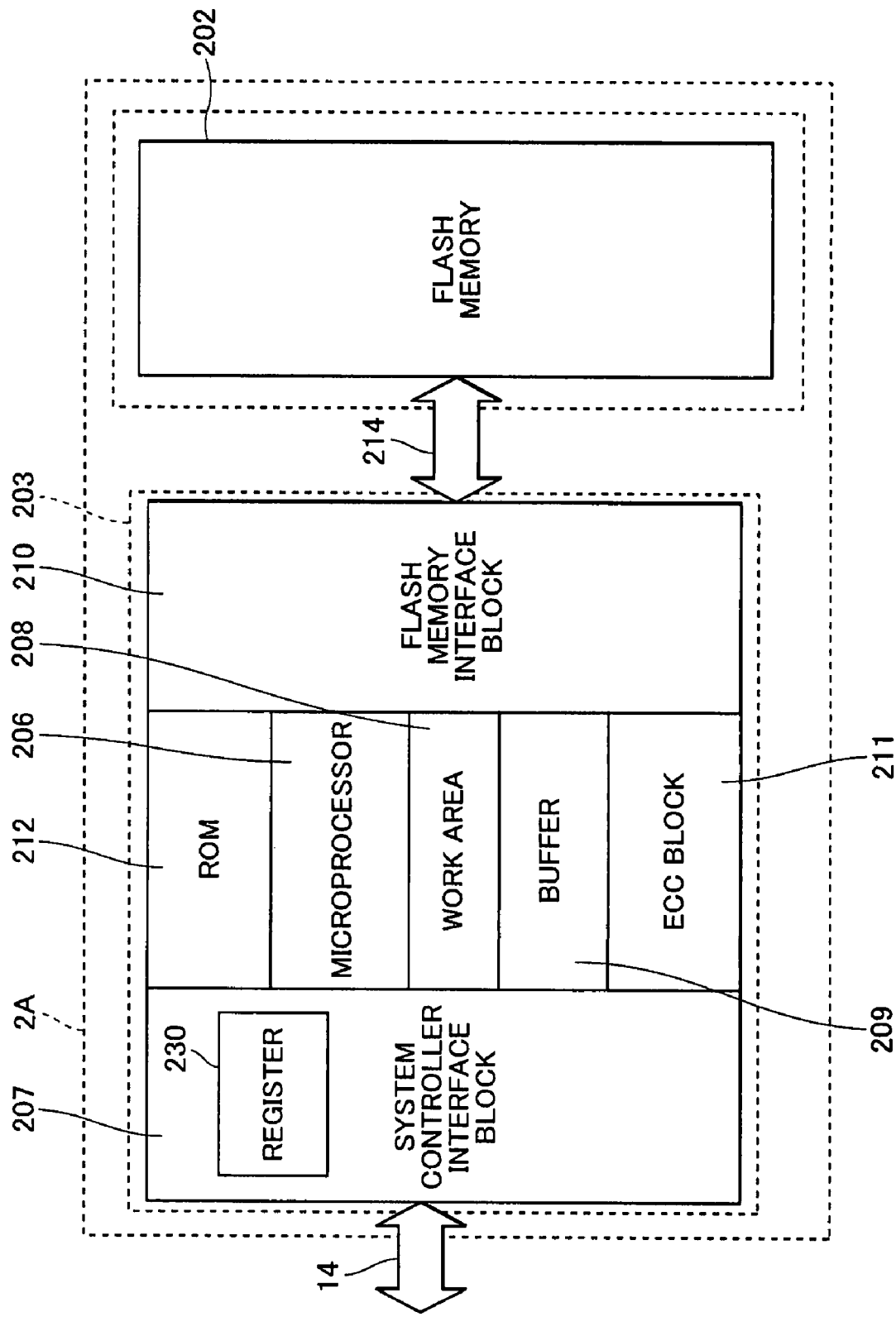
FIG. 3 is a block diagram showing the structure of a flash memory module provided in the flash memory system.

As shown in FIG. 3, the flash memory module 2A is configured of a flash memory 202, and the memory controller 203 for controlling the flash memory 202.

The memory controller 203 includes a microprocessor 206, a system controller interface block 207, a work area 208, a buffer 209, a flash memory interface block 210, an error correction code (ECC) block 211, and a ROM 212 that are connected to the system controller 3 via the internal bus 14. The memory controller 203 configured of these functional blocks is integrated on a single semiconductor chip. Next, each of the functional blocks will be described.

The microprocessor 206 controls the overall operations of the memory controller 203 according to programs stored in the ROM 212. For example, the microprocessor 206 reads a command set defining various processes from the ROM 212, supplies the command set to the flash memory interface block 210, and instructs the flash memory interface block 210 to execute a process.

Figure 4:
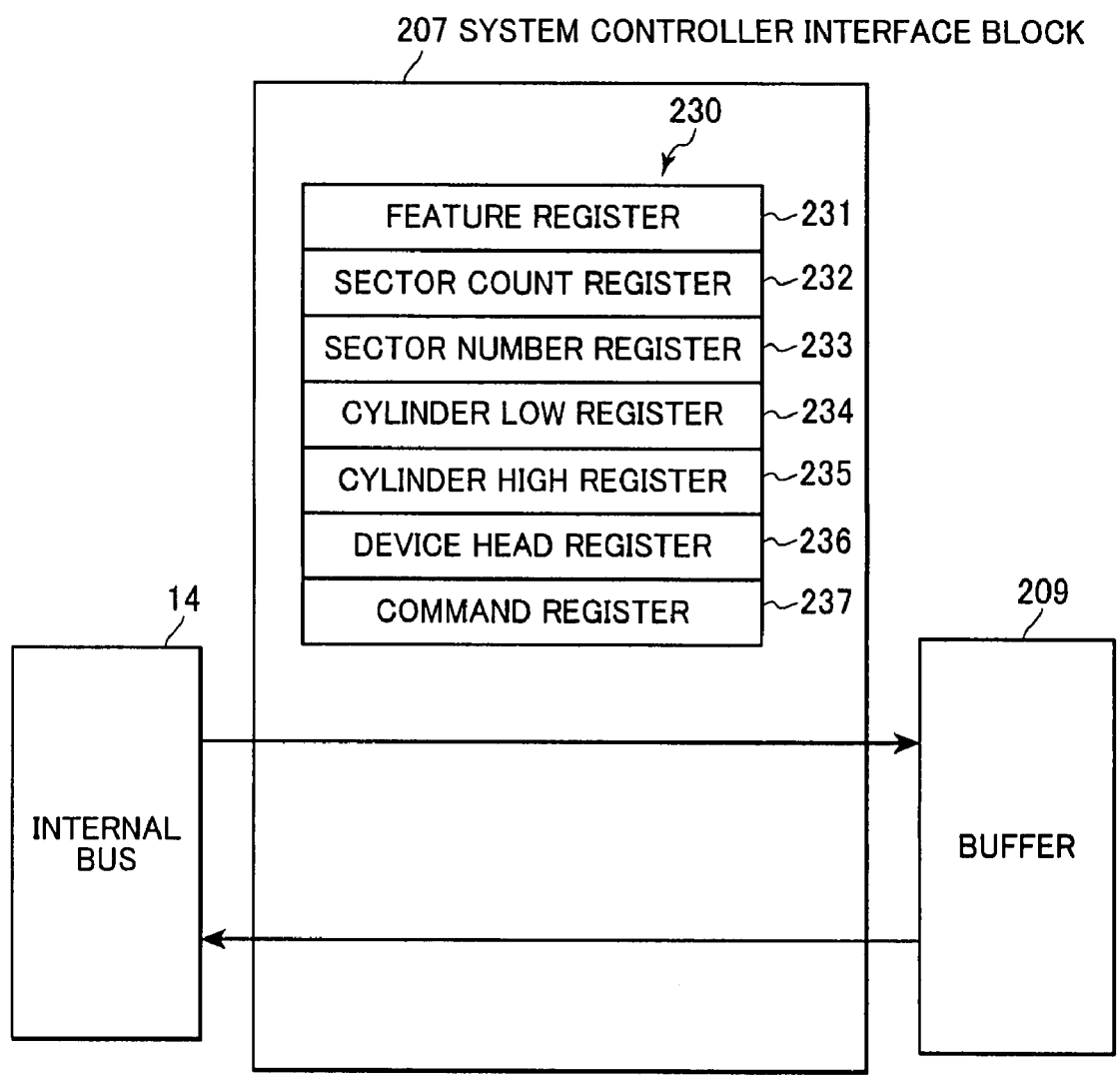
FIG. 4 is a block diagram showing the structure of a system controller interface block of a memory controller.

As shown in FIG. 4, the system controller interface block 207 has a set of registers 230, including a Feature register 231, a Sector Count register 232, a Sector Number register 233, a Cylinder Low register 234, a Cylinder High register 235, a Device Head register 236, and a Command register 237, as well as a Data register, Status register, and Error register not shown in the drawings. The system controller interface block 207 exchanges address data, status data, commands, and other data with the system controller 3.

Data supplied from the system controller 3 to the flash memory module 2A is inputted into the buffer 209, for example, in the flash memory module 2A via the system controller interface block 207. Further, data supplied from the flash memory module 2A to the system controller 3 is outputted via the system controller interface block 207.

The work area 208 is used to temporarily store data required for controlling the flash memory 202 and is configured of a plurality of SRAM cells.

The buffer 209 temporarily accumulates data read from the flash memory 202 and data to be written to the flash memory 202. Specifically, data read from the flash memory 202 is saved in the buffer 209 until the system controller 3 is able to receive the data. Data to be written to the flash memory 202 is saved in the buffer 209 until the flash memory 202 is in a writeable state.

The flash memory interface block 210 exchanges address data, status data, internal commands, and other data with the flash memory 202 via an internal bus 214.

The ECC block 211 generates an error correction code that is added to data written to the flash memory 202 and detects and corrects errors included in data read from the flash memory 202 based on an error correction code included in the data.

The ROM 212 is a nonvolatile storage device for storing programs that define steps in processes executed by the microprocessor 206. For example, the ROM 212 stores a program defining a procedure for creating an address conversion table. The address conversion table is used in a normal mode (described later) for converting a logical address inputted from the host system 4 to a physical address in the flash memory 202. Here, a logical address is an address in a logical address space managed on the host system 4 side and is described in units of sectors (512 bytes). A physical address is a block/page address managed on the flash memory 202 side indicating an actual data storage area in the flash memory 202. The logical address is converted to a physical address when writing data, in order to avoid accessing a specific physical address time after time.

The flash memory 202 shown in FIG. 3 is a nonvolatile memory configured of registers and an array of memory cells (both not shown). The flash memory 202 performs data reading or writing by copying data between registers and memory cells.

The cell array of the flash memory 202 includes a plurality of groups of memory cells and word lines (both not shown). Each memory cell group has a plurality of memory cells connected in series. Each word line functions to select a specific memory cell in the corresponding group. Data is copied between memory cells selected via the word lines and registers. Specifically, data is copied from a register to a selected memory cell and copied from a selected memory cell to a register.

The address space in the flash memory 202 is configured of pages and blocks (physical blocks).

Pages are processing units in data reading and data writing operations performed in the flash memory 202. The physical blocks are configured of a plurality of pages. For example, one page is configured of a one-sector (512-byte) user area, and a 16-byte redundant area, while one physical block is configured of 32 pages. In another type of flash memory, one page is configured of a four-sector user area, and a 64-byte redundant area, while one physical block is configured of 64 pages. The user area stores user data supplied from the host system 4.

Next, operations of the flash memory system 1 having the above configuration will be described. In the preferred embodiment, the flash memory system 1 performs operations in a "normal mode" and a "pass-through mode."

In the normal mode, when the host system 4 writes data to the flash memory 202 or reads or deletes data therefrom, the system controller 3 interprets and converts register values received from the host system 4 and sets register values in the registers 230 of the memory controller 203 for controlling the flash memory 202.

For example, when reading data written in the flash memory 202, the host system 4 sets a sector count in the Sector Count register 72 on the system controller 3 for data to be read, sets values in the Cylinder Low register 74 and Cylinder High register 75 indicating the top logical address of the data to be read, and stores an external command in the Command register 77 indicating a read command.

When a register value specifying a read process is set in the Command register 77, the system controller 3 finds the logical address for the top sector in one of the flash memory modules 2A-2D assigned as the destination of the data targeted for the read access, and the sector count. Next, the system controller 3 sets the sector count for the data to be read from the specified flash memory module 2 (2A-2D) in the Sector Count register 232 of the system controller interface block 207 located on the respective flash memory module 2 (2A-2D); sets the value of the top logical address for data to be read from the corresponding flash memory module 2 (2A-2D) in the Cylinder Low register 234 and Cylinder High register 235 in the corresponding flash memory module 2 (2A-2D); and sets the command instructing a read process in the Command register 237 on the respective flash memory module 2 (2A-2D).

When a command instructing the read process is set in the Command register 237, the corresponding flash memory module 2 (2A-2D) identifies the physical address from the logical address by referencing the address conversion table and begins the read process.

When writing data to the flash memory 202, the host system 4 sets the sector count in the Sector Count register 72 on the system controller 3 for data to be written, sets the top logical address in the Cylinder Low register 74 and Cylinder High register 75 for the region in which data is to be written, and sets an external command in the Command register 77 instructing a write operation.

When a register value indicating a write process is set in the Command register 77, the system controller 3 finds the logical address for the top sector and the number of sectors in the relevant flash memory module 2 (2A-2D) to which the data targeted for writing has been assigned.

Next, the system controller 3 sets the sector number for data to be written to the relevant flash memory module 2 (2A-2D) in the Sector Count register 232 of the system controller interface block 207 in the corresponding flash memory module 2 (2A-2D), sets the top logical address for data to be written to the relevant flash memory module 2 (2A-2D) in the Cylinder Low register 234 and Cylinder High register 235 of the corresponding flash memory module 2 (2A-2D), and sets a command instructing a write process in the Command register 237 on the relevant flash memory module 2 (2A-2D).

The system controller 3 also transfers data supplied from the host system 4 to the appropriate flash memory module 2 (2A-2D). When a command specifying a write process is set in the Command register 237, the flash memory module 2 (2A-2D) converts the above logical address to a physical address by performing a prescribed address conversion. The flash memory module 2 (2A-2D) then performs a process for writing data to the physical address obtained in the above conversion. Here, a correlation between the logical address specified by the host system 4 and the physical address actually used in the process on the flash memory module 2 (2A-2D) is stored in the 16-bit redundant area.

Next, the pass-through mode will be described. The pass-through mode is used when performing processes based on commands unique to the flash memory 202 that the system controller 3 is not programmed to interpret in the normal mode. Commands specific to the flash memory 202 may include a command for erasing data in block units; a command for reading data without performing error correction; a command for writing a serial number, model number, supported transfer modes, supported commands, to a specified region in the flash memory 202 prior to shipment, or a command for marking unusable areas of the flash memory 202.

Hence, in the pass-through mode, the system controller 3 does not perform operations to appropriately convert values set in the registers and to output the converted values to the memory controller 203. When a register value indicating a shift to the pass-through mode is issued, the system controller 3 transfers the actual data, such as register values, data that has been read, or data to be written, from the host system 4 to the flash memory modules 2 (2A-2D) or from the flash memory modules 2 to the host system 4 as is.

Next, operations of the flash memory system 1 according to the preferred embodiment in the pass-through mode including a mode shift and a method for controlling the flash memory modules 2 will be described while referring to FIGS. 5 through 23. The description of the preferred embodiment will use vendor commands for three protocols as examples. The three protocols are a non-data command protocol for data erasure, a programmed I/O (PIO) data-in command protocol for reading data, and a PIO data-out command protocol for writing data.

Figure 5:
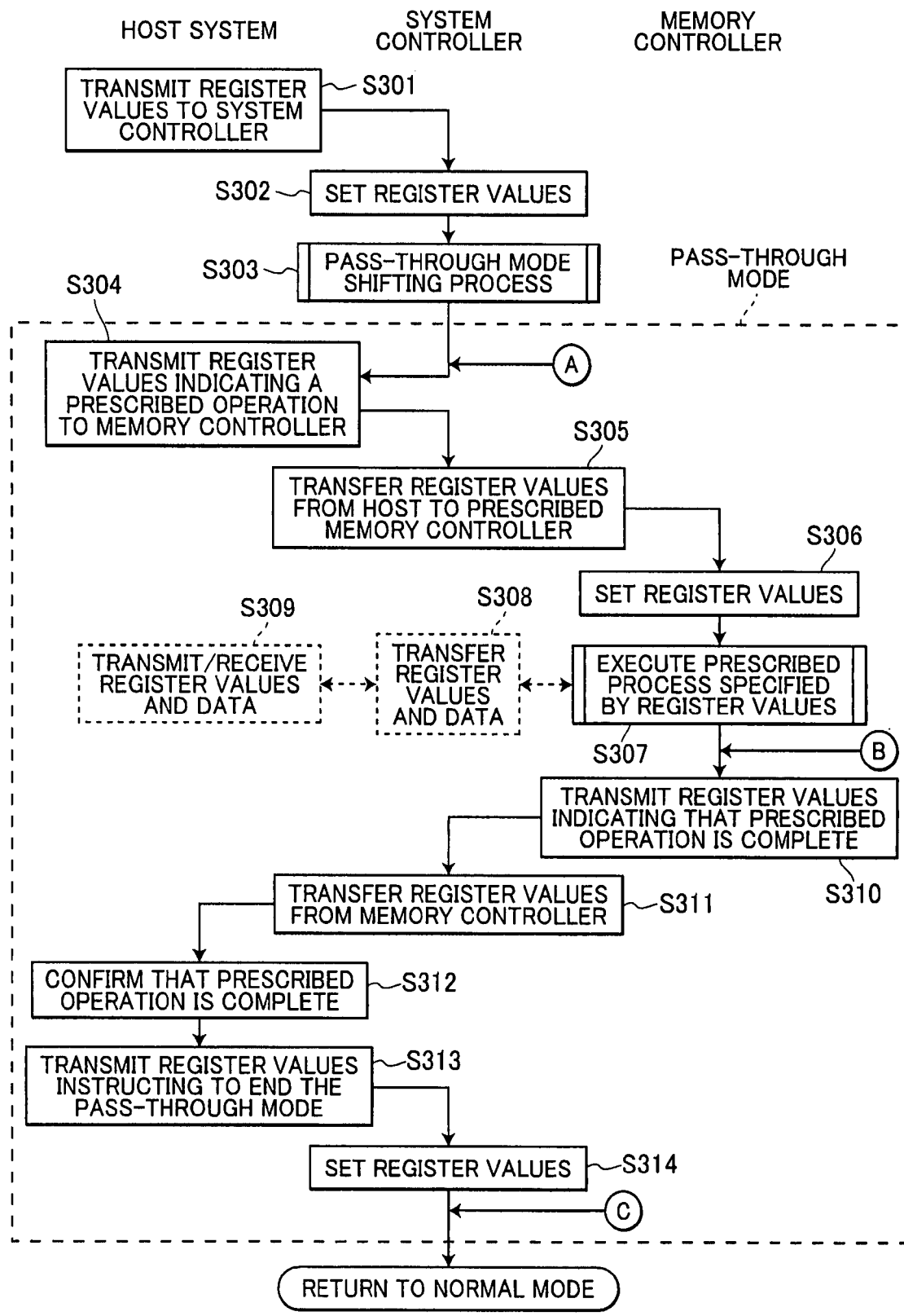
FIG. 5 is a flowchart illustrating steps in an operation performed on the flash memory system.

The flowchart in FIG. 5 shows an overall process of operations, with operations sorted among three operational units: the host system 4, the system controller 3, and the memory controller 203. In FIG. 5, steps S308 and S309 indicated with dotted lines are process performed according to the PIO data-in command protocol and the PIO data-out command protocol and not performed according to the non-data command protocol.

First, a pass-through mode process according to the non-data command protocol will be described. In the normal mode, an Erase Sector can be used for specifying erasure in sector units. However, as described below, it is possible to erase data in block units with a single vendor command issued under the non-data command protocol. With this method, the host system 4 directly specifies a physical block address in the flash memory 2. As shown in FIG. 5, in S301 the host system 4 transmits register values to the system controller 3. The register values are set in the register values in the Feature register 71, Sector Count register 72, Sector Number register 73, Cylinder Low register 74, Cylinder High register 75, Device Head register 76, and Command register 77 described above.

For example, when the flash memory module 2A is targeted for a shift to the pass-through mode in the non-data command protocol, the register values 171 shown in FIG. 10 (the register values 171 include all seven register values) are set in the registers 70. Specifically, the register value "00h" is set in the Feature register 71 indicating the non-data command protocol, the register value "00h" is set in the Sector Count register 72 indicating a transfer sector count of 0, the register value "00h" is set in the Sector Number register 73 indicating the transfer destination for data after shifting to the pass-through mode, which is the flash memory module 2A in this case, the register value "4Bh" is set in the Cylinder Low register 74 indicating the keyword "K" for allowing a mode shift, the register value "45h" is set in the Cylinder High register 75 indicating the keyword "E" for allowing a mode shift, the register value "59h" is set in the Device Head register 76 indicating the keyword "Y" for allowing a mode shift, and the register value "FFh" is set in the Command register 77 indicating a command to shift to the pass-through mode. Since the system controller 3 does not reference the Sector Count register 72 in the non-data command protocol, the following process does not change, even when an arbitrary value other than "00h" is set in the Sector Count register 72.

Figure 6:
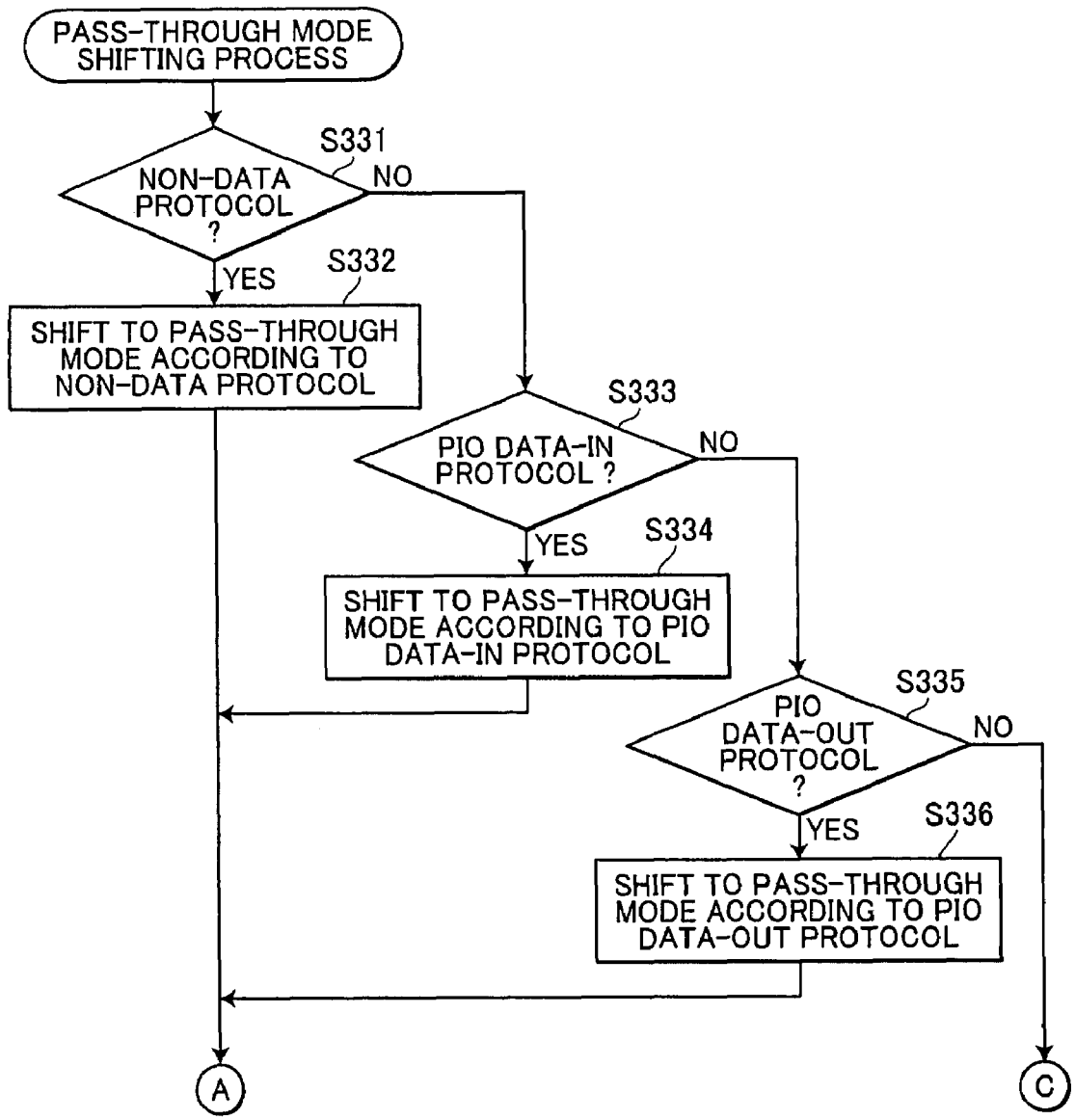
FIG. 6 is a flowchart illustrating steps in a pass-through mode shifting process performed on the system controller.
Figure 7:
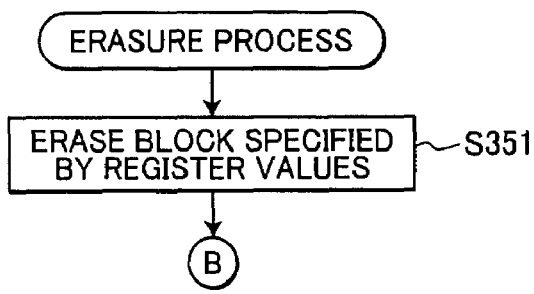
FIG. 7 is a flowchart illustrating steps in an erasure process performed on the memory controller.

When the register values 171 are set in the registers 70, in S303 the system controller 3 performs a process to shift to the pass-through mode while referencing the register values. Steps in the process for shifting to the pass-through mode are shown in the flowchart of FIG. 6. Specifically, in S331 the system controller 3 interprets each register value in the registers 70 and determines whether to shift to the pass-through mode and, if so, what protocol to use when entering the pass-through mode.

Specifically, in S331 the system controller 3 references the register values 171 that have been set in the Feature register 71, Cylinder Low register 74, Cylinder High register 75, Device Head register 76, and Command register 77 to determine whether to shift to the pass-through mode in the non-data command protocol. When referencing the register values 171 described above, the system controller 3 determines to shift to the pass-through mode targeting the flash memory module 2A under the non-data command protocol (S331: YES). In S332 the system controller 3 shifts to the pass-through mode under the non-data command protocol and returns to A in FIG. 5.

In S304 the host system 4 transmits register values to the memory controller 203 indicating a prescribed operation. For example, when issuing a command to the memory controller 203 for erasing block no. 1000, the host system 4 transmits register values 173 shown in FIG. 11 to the system controller 3.

Specifically, the register value "E8h" is set in the Cylinder Low register 74 indicating the low-order two digits of a physical block address to be erased in the flash memory 202, the register value "03h" is set in the Cylinder High register 75 indicating the high-order two digits of a physical block address to be erased in the flash memory 202, and the register value "F1h" is set in the Command register 77 specifying a vendor command specific to the memory controller (a command different from the Erase Sector command in the normal mode) instructing the memory controller 203 to erase the specified block. In this process, the Feature register 71, Sector Count register 72, Sector Number register 73, and Device Head register 76 are not referenced.

In S305 the system controller 3 confirms that a register value for ending the pass-through mode has not been set in the Command register 77 and, if not, transfers the register values 173 to the memory controller 203.

In S306 the register values 173 transferred from the system controller 3 are set in the registers 230 of the flash memory module 2A.

The memory controller 203 interprets the register values set in the Command register 237 as a command to erase a block. The memory controller 203 also recognizes that the physical address of the block to be erased is "03E8h" by interpreting the register values in the Cylinder Low register 234 and Cylinder High register 235. In S307 the memory controller 203 performs the prescribed operation specified in S306. Specifically, in S351 of the flowchart in FIG. 7, the memory controller 203 erases the block at address "03E8h" in the flash memory 202, i.e. block no. 1000.

In S310 the memory controller 203 transfers register values in the registers 230 to the registers 70 of the system controller 3. Consequently, the system controller 3 receives register values 175 shown in FIG. 12. In the register values 175 shown in FIG. 12, the register value "00h" has been set in the Error register indicating that an error did not occur, and a register value "50h" has been set in the Status register indicating that the block erasing process performed on the flash memory 202 was successful. Here, the Sector Count register 72, Sector Number register 73, Cylinder Low register 74, Cylinder High register 75, and Device Head register 76 are not referenced.

In S311 the system controller 3 transfers the register values 175 received from the memory controller 203 to the host system 4. In S312 the host system 4 interprets the register values 175 and determines that the block erasure operation was completed.

In S313 the system controller 3 transmits register values 177 shown in FIG. 13 to the system controller 3 instructing the system controller 3 to end the pass-through mode. Specifically, the register value "00h" is set in the Feature register 71 indicating the non-data command protocol, the register value "00h" is set in the Sector Number register 73 specifying the flash memory module 2A as the target of data transfers in the pass-through mode, register values "4Bh", "45h", and "59h" are set in the Cylinder Low register 74, Cylinder High register 75, and Device Head register 76, respectively, expressing keywords to allow a mode shift, and the register value "FEh" is set in the Command register 77 indicating a command for shifting from the pass-through mode back to the normal mode. Here, the Sector Count register 72 is not referenced.

In S314 the system controller 3 determines that the host system 4 has issued a command to end the pass-through mode by interpreting the register values 177 set in the Cylinder Low register 74, Cylinder High register 75, Device Head register 76, and Command register 77.

The system controller 3 interprets the value in the Feature register 71 to confirm that the protocol is the non-data command protocol and interprets the value in the Sector Number register 73 and the Command register 77 to confirm that the flash memory module 2A is the targeted module for which the pass-through mode is to be ended. At this time, the system controller 3 ends the pass-through mode for the flash memory module 2A according to the non-data command protocol and returns to the normal mode. The above operations cover a pass-through mode process targeting the flash memory module 2A in the non-data command protocol.

A pass-through mode process according to the PIO data-in command protocol will be described next. When reading data in the normal mode, data read from the flash memory 202 undergoes error correction in the ECC block 211 before being transferred to the system controller 3. However, when using the PIO data-in command protocol described below, it is possible to read data without performing error correction when confirming whether an error is generated at a specific physical address, for example. As in the process according to the non-data command protocol, in S301 of FIG. 5 the host system 4 transmits register values to the system controller 3 and in S302 the system controller 3 sets the register values in the registers 70.

For example, when shifting to the pass-through mode to transfer two sectors of data from the flash memory module 2B according to the PIO data-in command protocol, register values 179 shown in FIG. 14 are set in the registers 70. Specifically, the register value "01h" is set in the Feature register 71 indicating the PIO data-in command protocol, the register value "02h" is set in the Sector Count register 72 indicating that the transfer sector count is two, the register value "01h" is set in the Sector Number register 73 indicating an identifier for the flash memory module 2B serving as the destination for the data transfer after shifting to the pass-through mode, the register value "4Bh" is set in the Cylinder Low register 74 indicating the keyword "K" for allowing a mode shift, the register value "45h" is set in the Cylinder High register 75 indicating the keyword "E" for allowing a mode shift, the register value "59h" is set in the Device Head register 76 indicating the keyword "Y" for allowing a mode shift, and the register value "FFh" is set in the Command register 77 indicating a command for shifting to the pass-through mode.

After the register values are set in the registers 70, in S303 the system controller 3 performs a process to shift to the pass-through mode by referencing the register values. Detailed steps in the process for shifting to the pass-through mode are shown in the flowchart of FIG. 6. As shown in FIG. 6, in S331 the system controller 3 interprets the register values in the registers 70 and determines whether to shift to the pass-through mode and, if so, what protocol to use when entering the pass-through mode.

Specifically, the system controller 3 determines whether to shift to the pass-through mode by referencing the register values 179 that have been set in the Feature register 71, Cylinder Low register 74, Cylinder High register 75, Device Head register 76, and Command register 77. When referencing the register values 179 described above, the system controller 3 determines in S331 not to shift to the pass-through mode under the non-data command protocol (S331: NO). In S333 the system controller 3 determines based on the register values that the host system 4 has instructed a shift to the pass-through mode targeting the flash memory module 2B according to the PIO data-in command protocol (S333: YES). In S334 the system controller 3 shifts to the pass-through mode according to the PIO data-in command protocol and returns to A in FIG. 5.

In S304 of FIG. 5, the host system 4 transmits register values to the memory controller 203 indicating a prescribed operation. For example, when issuing a command to the memory controller 203 for reading data from page 15 in block no. 1000 according to the PLIO data-in command protocol, the host system 4 transmits register values 181 shown in FIG. 15 to the system controller 3. In this operation, one page of data in the user area and data in the redundant area will be read from the flash memory 202. Accordingly, 512 bytes from the user area and 16 bytes from the redundant area, i.e. two sectors worth of data, will be transferred.

At this time, the register value "0Fh" is set in the Sector Number register 73 indicating a page number for performing the data read operation, a register value "E8h" is set in the Cylinder Low register 74 indicating the low-order two digits for the physical block address to be read in the flash memory 202, the register value "03h" is set in the Cylinder High register 75 indicating the high-order two digits for the physical block address to be read in the flash memory 202, and the register value "F2h" is set in the Command register 77 indicating a vendor command specific to the memory controller for instructing the memory controller 203 to execute the data read process. Here, the Feature register 71, Sector Count register 72, and Device Head register 76 are not referenced.

In S305 the system controller 3 confirms that a register value instructing the system controller 3 to end the pass-through mode has not been set in the Command register 77 and, if not, transfers the register values 181 to the memory controller 203.

In S306 the register values 181 received from the system controller 3 are set in the registers 230 of the flash memory module 2B. The memory controller 203 interprets the register value set in the Command register 237 to indicate a data read process. Further, by interpreting register values in the Sector Number register 233, Cylinder Low register 234, and Cylinder High register 235, the memory controller 203 determines that the physical address for the block to be read is "03E8h" and the physical address of the page to be read is "0Fh". In S307 the memory controller 203 performs the prescribed operation specified in S306. Specifically, in S361 in the flowchart shown in FIG. 8, the memory controller 203 reads data for page "0Fh" of block "03E8h" in the flash memory 202, i.e. data from page 15 in block no. 1000, and saves the data in the buffer 209.

In the normal mode, the system controller 3 performs control that ensures data read from the flash memory modules 2 undergoes error correction in the ECC block 211. The flash memory module 2B is controlled without performing error correction at this time, in order to identify whether the error is occurred during writing or reading.

In S362 of FIG. 8, the memory controller 203 transfers a register value to the system controller 3 indicating that preparations for transmitting read data to the system controller 3 have been completed. As a result, the system controller 3 receives register values 183 shown in FIG. 16. This process corresponds to S308 in FIG. 5 performed on the system controller 3 and is not performed with the non-data command protocol. Specifically, the register value "58h" are set in the Command register 77 indicating that preparations for a data transfer are complete.

The system controller 3 transfers the register values 183 to the host system 4. In S309 the host system 4 receives the register values and confirms that the flash memory module 2B has completed preparations for transmitting data. In S363 of FIG. 8, the memory controller 203 transmits data saved in the buffer 209 to the system controller 3, and the system controller 3 transfers the data to the host system 4 (also S309).

After completing the read process, in S310 the memory controller 203 transfers register values in the registers 230 to the registers 70 on the system controller 3. Accordingly, the system controller 3 receives register values 185 shown in FIG. 17. Specifically, the register value "00h" has been set in the Error register in the register values 185 indicating that an error did not occur, and the register value "50h" has been set in the Status register indicating that the read process in the flash memory 202 was successful. Here, the Sector Count register 72, Sector Number register 73, Cylinder Low register 74, Cylinder High register 75, and Device Head register 76 are not referenced.

In S311 the system controller 3 transfers the register values 185 shown in FIG. 17 to the host system 4. In S312 the host system 4 interprets the register values 185 received from the system controller 3 and confirms that the read operation was completed. In S313 the host system 4 transmits register values 187 shown in FIG. 18 to the system controller 3 instructing the system controller 3 to end the pass-through mode.

Specifically, the value "01h" is set in the Sector Number register 73 indicating that the flash memory module 2B that performed the read operation, register values "4Bh", "45h", and "59h" are set in the Cylinder Low register 74, Cylinder High register 75, and Device Head register 76, respectively, expressing the keywords for allowing a mode shift, and the value "FEh" is set in the Command register 77 indicating a command to revert from the pass-through mode back to the normal mode. Here, the Sector Count register 72 is not referenced.

In S314 the system controller 3 confirms that the command is a command for ending the pass-through mode by interpreting the register values 187 inputted into the Cylinder Low register 74, Cylinder High register 75, Device Head register 76, and Command register 77. Next, the system controller 3 interprets the Feature register 71 to confirm that the protocol is the PIO data-in command protocol and interprets the register value in the Sector Number register 73 and the Command register 77 to confirm that the flash memory module 2B is the target for which the pass-through mode is to be ended. At this time, the system controller 3 ends the pass-through mode for the flash memory module 2B according to the PIO data-in command protocol and returns to the normal mode. The above example was an operation performed on the flash memory module 2B in the pass-through mode according to the PIO data-in command protocol.

Next, a pass-through mode process according to the PIO data-out command protocol will be described. As in the process according to the PIO data-in command protocol, in S301 of FIG. 5 the host system 4 transmits register values to the system controller 3, and in S302 the register values are set in the registers 70 of the system controller 3.

For example, when shifting to the pass-through mode while transferring two sectors of data to the flash memory module 2C according to the PIO data-out command protocol, register values 189 shown in FIG. 19 are set in the registers 70. Specifically, the register value "02h" is set in the Feature register 71 indicating the PIO data-out command protocol, the register value "02h" is set in the Sector Count register 72 indicating that the transfer sector count is two, the register value "02h" is set in the Sector Number register 73 indicating an identifier for the flash memory module 2C serving as the destination for data transferred after shifting to the pass-through mode, the register value "4Bh" is set in the Cylinder Low register 74 indicating the keyword "K" for allowing a mode shift, the register value "45h" is set in the Cylinder High register 75 indicating the keyword "E" for allowing a mode shift, the register value "59h" is set in the Device Head register 76 indicating the keyword "Y" for allowing a mode shift, and the register value "FFh" is set in the Command register 77 indicating a command for shifting to the pass-through mode.

When the register values 189 shown in FIG. 19 are set in the registers 70, in S303 the system controller 3 performs a process to shift to the pass-through mode by referencing the register values. Detailed steps in the process for shifting to the pass-through mode are shown in the flowchart of FIG. 6. As shown in FIG. 6, the system controller 3 interprets the register values in the registers 70 to determine whether to shift to the pass-through mode and, if so, what protocol to use when entering the pass-through mode.

Specifically, the system controller 3 determines whether to shift to the pass-through mode by referencing the register values 189 that have been set in the Feature register 71, Cylinder Low register 74, Cylinder High register 75, Device Head register 76, and Command register 77. In S331 and S333, the system controller 3 references register values and determines not to shift to the pass-through mode under either the non-data command protocol or the PIO data-in command protocol (S331: NO, S333: NO). In S335 the system controller 3 determines to shift to the pass-through mode targeting the flash memory module 2C according to the PIO data-out command protocol. In S336 the system controller 3 shifts to the pass-through mode according to the PIO data-out command protocol and returns to A in FIG. 5. However, if the system controller 3 determines in S335 not to shift to the pass-through mode according to the PIO data-out command protocol (S335: NO), then the system controller 3 returns to C in FIG. 5 and executes a process to return to the normal mode.

In S304 of FIG. 5, the host system 4 transmits register values to the memory controller 203 indicating a prescribed operation. For example, when issuing a command to the memory controller 203 to perform a data write operation according to the PIO data-out command protocol in page 15 of block no. 1000, the host system 4 transmits register values 191 shown in FIG. 20 to the system controller 3.

Specifically, the register value "0Fh" is set in the Sector Number register 73 indicating the page number for writing data, the register value "E8h" is set in the Cylinder Low register 74 indicating the low-order two digits for the physical block address in the flash memory 202 for writing data, the register value "03h" is set in the Cylinder High register 75 indicating the high-order two digits for the physical block address in the flash memory 202 for writing data, and the register value "F3h" is set in the Command register 77 indicating a vendor command specific to the memory controller for instructing the memory controller 203 to perform a write process. Here, the Feature register 71, Sector Count register 72, and Device Head register 76 are not referenced.

In S305, when the system controller 3 confirms that a register value instructing the system controller 3 to end the pass-through mode has not been set in the Command register 77, the system controller 3 transfers the register values 191 to the memory controller 203.

In S306 the memory controller 203 in the flash memory module 2C sets the register values 191 received from the system controller 3 in the registers 230. The memory controller 203 interprets the register value set in the Command register 237 to indicate a data write process. Further, by interpreting register values in the Sector Number register 233, Cylinder Low register 234, and Cylinder High register 235, the memory controller 203 determines that the physical address of the physical block for writing data is "03E8h" and the physical address of the page in which data is to be written is "0Fh".

In S307 the memory controller 203 performs the prescribed operation specified in S306. Specifically, in S371 of the flowchart shown in FIG. 9, the memory controller 203 transfers register values to the system controller 3 indicating that write preparations have been completed. As a result, the system controller 3 receives register values 193 shown in FIG. 21. This process corresponds to S308 in FIG. 5 performed on the system controller 3. This process is not performed under the non-data command protocol. Here, the register value "58h" is set in the Command register 77 indicating that data write preparations are complete.

The system controller 3 transfers the register values 193 to the host system 4. In S309 the host system 4 receives the register values and confirms that the flash memory module 2C has completed preparations for a write process. Subsequently, the host system 4 transmits write data to the system controller 3, and the system controller 3 transfers the data to the memory controller 203.

In S372 of FIG. 9, the memory controller 203 receives the write data. In S373 the memory controller 203 writes the data to page "0Fh" in physical block "03E8h" of the flash memory 202, that is, page 15 in block no. 1000.

After completing the write process, in S310 of FIG. 5 the memory controller 203 transfers register values from the registers 230 to the registers 70 on the system controller 3. Accordingly, the system controller 3 receives register values 195 shown in FIG. 22. Specifically, in the register values 195, the register value "00h" has been set in the Error register indicating that an error did not occur, and the register value "50h" has been set in the Status register indicating that the write process in the flash memory 202 was successful. Here, the Sector Count register 72, Sector Number register 73, Cylinder Low register 74, Cylinder High register 75, and Device Head register 76 are not referenced.

In S311 the system controller 3 transfers the register values 195 inputted from the memory controller 203 to the host system 4. In S312 the host system 4 interprets the register values 195 and confirms that the write operation was completed.

In S313 the host system 4 transmits register values 197 shown in FIG. 23 to the system controller 3 instructing the system controller 3 to end the pass-through mode. Specifically, the value "02h" is set in the Feature register 71 indicating that the protocol is the PIO data-out command protocol, a value "02h" is set in the Sector Number register 73 indicating that the flash memory module 2C performed the write operation, register values "4Bh", "45h", and "59h" are set in the Cylinder Low register 74, Cylinder High register 75, and Device Head register 76, respectively, expressing the keywords for allowing a mode shift, and the value "FEh" is set in the Command register 77 indicating a command to return to the normal mode. Here, the Sector Count register 72 is not referenced.

In S314 the system controller 3 confirms that a command has been received to end the pass-through mode by interpreting the register values 197 inputted into the Cylinder Low register 74, Cylinder High register 75, Device Head register 76, and Command register 77. Next, the system controller 3 interprets the value in the Feature register 71 to confirm that the protocol is the PIO data-out command protocol and interprets the register value in the Sector Number register 73 and the Command register 77 to confirm that the flash memory module 2C is the target for which the pass-through mode is to be ended. At this time, the system controller 3 ends the pass-through mode for the flash memory module 2C according to the PIO data-out command protocol and returns to the normal mode. The above example covered an operation in the pass-through mode performed on the flash memory module 2C according to the PIO data-out command protocol.

With the system controller for flash memory, flash memory system having the system controller, and method of controlling flash memory modules according to the preferred embodiment described above in detail, the system controller 3 interprets register values inputted from the host system 4 and shifts to the pass-through mode according to the non-data command protocol, PIO data-in command protocol, or PIO data-out command protocol based on the register values.

In the pass-through mode, the system controller 3 transfers register values inputted from the host system 4 to the memory controller 203. Therefore, it is not necessary to modify commands for controlling the flash memory 202 or to modify the control program of the system controller 3 itself, even when the commands are vendor commands, thereby reducing the time and cost required for such modifications. Further, the system controller 3 transfers register values received from the memory controller 203 to the host system 4. Accordingly, in the pass-through mode, the system controller 3 and memory controller 203 can exchange data bi-directionally. After shifting to the pass-through mode, the system controller 3 can detect register values instructing the system controller 3 to end the pass-through mode. When the system controller 3 determines that register values for ending the pass-through mode have been set, the system controller 3 can end the pass-through mode and return to the normal mode.

When a plurality of memory controllers 203 are connected to the system controller 3, the transfer destination of data inputted from the host system 4 can be specified in the Sector Number register 73.

When shifting between the normal mode and pass-through mode, a command for shifting to the pass-through mode or for ending the pass-through mode is inputted into the Command register 77. However, the mode shifting process can be performed more reliably by inputting keywords in the Cylinder Low register 74, Cylinder High register 75, and Device Head register 76.

As described above in detail, the system controller 3 operates in either the pass-through mode or the normal mode. In the pass-through mode, the system controller 3 transfers data between the host system 4 and memory controller 203. At this time, the memory controller 203 is controlled based on register values that the host system 4 inputs via the system controller 3. In the normal mode, the system controller 3 interprets register values inputted from the host system 4 and modifies the register values to generate new register values, and the memory controller 203 is controlled based on the new register values generated by the system controller 3. Hence, by changing the mode on the system controller 3 side, the memory controller 203 can be controlled even if the type or specifications of the memory controller 203 change.

While the system controller for flash memory, flash memory system having the system controller, and method of controlling flash memory modules according to the present invention have been described in detail with reference to specific embodiments thereof, it would be apparent to those skilled in the art that many modifications and variations may be made therein without departing from the spirit of the invention, the scope of which is defined by the attached claims. For example, while three protocols were used as examples of protocols for the pass-through mode in the preferred embodiment, other protocols may be used. Further, the commands executed in each protocol can be modified and are not limited to the commands described above. The functional structures of the system controller 3 and the memory controller 203 are also not limited to the above description and may be configured differently, provided that the system controller 3 and memory controller 203 have similar functions.

What is claimed is:

1. A system controller to exchange data with a host system and to exchange data with a memory controller that accesses flash memory, the system controller comprising:

an interpreting unit interpreting first operation instruction data supplied from the host system;

a first instruction data supplying unit generating second operation instruction data based on a result of interpretation by the interpreting unit, the second operation instruction data instructing the memory controller to execute an operation, the first instruction data supplying unit transmitting the second operation instruction data to the memory controller;

a second instruction data supplying unit transferring the first operation instruction data provided from the host system to the memory controller; and a controlling unit selectively operating the first instruction data supplying unit and the second instruction data supplying unit, wherein if the interpreting unit interprets the first operation instruction data as data instructing to begin an operation with the second instruction data supplying unit, the controlling unit shifts to a first mode that halts the first instruction data supplying unit and that begins an operation with the second instruction data supplying unit, and if the interpreting unit interprets the first operation instruction data as data instructing to halt the second instruction data supplying unit, the controlling unit shifts to a second mode that halts the second instruction data supplying unit and that begins an operation with the first instruction data supplying unit.

2. The system controller as claimed in claim 1, further comprising an operation result transferring unit transferring data provided from the memory controller to the host system while the second instruction data supplying unit is operating, the data indicating a result of an operation implemented by the memory controller based on the first operation instruction data.

3. The system controller as claimed in claim 1, wherein if the first operation instruction data instructs to begin an operation with the second instruction data supplying unit, the first operation instruction data includes an identifier identifying the memory controller to transfer data.

4. The system controller as claimed in claim 3, wherein the first operation instruction data further includes a command for shifting to the first mode if the first operation instruction data instructs to begin an operation with the second instruction data supplying unit.

5. The system controller as claimed in claim 4, wherein the first operation instruction data further includes a keyword for permitting to shift to the first mode if the first operation instruction data instructs to begin an operation with the second instruction data supplying unit.

6. A flash memory system to exchange data with a host system, the flash memory system comprising;

a flash memory;

a memory controller accessing the flash memory; and a system controller exchanging data with the memory controller, the system controller includes;

an interpreting unit interpreting first operation instruction data supplied from the host system;

a first instruction data supplying unit generating second operation instruction data based on a result of interpretation by the interpreting unit, the second operation instruction data instructing the memory controller to execute an operation, the first instruction data supplying unit transmitting the second operation instruction data to the memory controller;

a second instruction data supplying unit transferring the first operation instruction data provided from the host system to the memory controller; and a controlling unit selectively operating the first instruction data supplying unit and the second instruction data supplying unit, wherein if the interpreting unit interprets the first operation instruction data as data instructing to begin an operation with the second instruction data supplying unit, the controlling unit shifts to a first mode that halts the first instruction data supplying unit and that begins an operation with the second instruction data supplying unit, and if the interpreting unit interprets the first operation instruction data as data instructing to halt the second instruction data supplying unit, the controlling unit shifts to a second mode that halts the second instruction data supplying unit and that begins an operation with the first instruction data supplying unit.

7. The flash memory system as claimed in claim 6, further comprising an operation result transferring unit transferring data provided from the memory controller to the host system while the second instruction data supplying unit is operating, the data indicating a result of an operation implemented by the memory controller based on the first operation instruction data.

8. The flash memory system as claimed in claim 6, wherein if the first operation instruction data instructs to begin an operation with the second instruction data supplying unit, the first operation instruction data includes an identifier identifying the memory controller to transfer data.

9. The flash memory system as claimed in claim 8, wherein the first operation instruction data further includes a command for shifting to the first mode if the first operation instruction data instructs to begin an operation with the second instruction data supplying unit.

10. The flash memory system as claimed in claim 9, wherein the first operation instruction data further includes a keyword for permitting to shift to the first mode if the first operation instruction data instructs to begin an operation with the second instruction data supplying unit.

11. A method for controlling a plurality of flash memory modules, based on data supplied from a host system, each of the plurality of the flash memory modules including a flash memory and a memory controller that accesses the flash memory, the method comprising:

interpreting first operation instruction data supplied from the host system;

generating a second operation instruction data and transmitting resultant data to the memory controller to execute an operation based on a result of interpretation by the interpreting step; and transferring the first operation instruction data provided from the host system to the memory controller;

selectively executing the generating/transmitting step and the transferring step, wherein if the interpreting step interprets the first operation instruction data to be data instructing to begin the transferring step, the selectively operating step halts the generating/transmitting step and operates the transferring step, and if the interpreting step interprets the first operation instruction data to be data instructing to halt the transferring step, the selectively operating step halts the transferring step, and begins the generating/transmitting step.

* * * * *